United States Patent [19]

Parks

[11] Patent Number: 5,109,426
[45] Date of Patent: Apr. 28, 1992

[54] METHODS AND APPARATUS FOR SIGNATURE VERIFICATION

[75] Inventor: John R. Parks, Hampshire, England

[73] Assignee: National Research Development Corporation, London, England

[21] Appl. No.: 610,209

[22] Filed: Nov. 8, 1990

[30] Foreign Application Priority Data

Nov. 10, 1989 [GB] United Kingdom ............... 8925478
Jul. 16, 1990 [GB] United Kingdom ............... 9015582

[51] Int. Cl.⁵ .............................................. G06K 9/00
[52] U.S. Cl. .......................................... 382/3; 382/13; 382/30
[58] Field of Search ................. 382/3, 13, 30, 34, 38; 178/18-20; 340/825.3, 825.34

[56] References Cited

U.S. PATENT DOCUMENTS

| | | | |
|---|---|---|---|
| 3,885,097 | 5/1975 | Pobgee | 178/18 |
| 4,562,592 | 12/1985 | Chainer | 382/3 |
| 4,680,801 | 7/1987 | Ethington et al. | 382/3 |
| 4,724,592 | 2/1988 | Williford | 382/3 |
| 4,736,445 | 4/1988 | Gundersen | 382/13 |
| 4,789,934 | 12/1988 | Gundersen et al. | 382/13 |
| 4,901,358 | 2/1990 | Bechet | 382/3 |

FOREIGN PATENT DOCUMENTS

| | | |
|---|---|---|
| 1480066 | 7/1977 | United Kingdom . |
| 1516220 | 6/1978 | United Kingdom . |
| 2062323 | 5/1981 | United Kingdom . |
| 2183071 | 5/1987 | United Kingdom . |

OTHER PUBLICATIONS

IBM Technical Disclosure Bulletin, vol. 17, No. 12, May 1975, pp. 3754-3755, C. T. Baker, Jr., "Self-Editing Comparator", the whole document.
IBM Technical Disclosure Bulletin, vol. 17, No. 12, May 1975, pp. 3787-3970, C. J. Evangelisti et al.: "Pen-Lieft Eliminator", p. 3788, paragraphs 1-2.

*Primary Examiner*—Joseph Mancuso
*Attorney, Agent, or Firm*—Cushman, Darby & Cushman

[57] ABSTRACT

A major problem in automatic signature verification is the rejection of true signatures. One way of capturing a signature is to use a special pen 10 to write on an area 13 having horizontal lines, the pen being constructed to pass a signal to a computer 11 indicating whether the pen tip is in contact with the area 13 and when the lines in the area 13 are crossed. Signals characteristic of signatures derived in this way are analyzed and stored. To enable verification to be carried out a number of authentic signatures are analyzed and a number of measures such as means and standard deviations of signature features are determined and stored. When a trial signature is to be verified, the same features of the trial signature are measured and the results are compared with the stored measures. It has been discovered that many false rejections of true signatures are due to variations of certain types such as hesitations which occur when the pen tip is off the writing area between inked segments of the signature. The method of the invention allows for such time variations by, for example, modifying the measurements obtained from the trial signature to remove the effect of these variations if a rejection occurs and then comparing the modified measurements with the stored measurements to determine whether the trial signature can now be accepted.

20 Claims, 4 Drawing Sheets

METHODS AND APPARATUS FOR SIGNATURE VERIFICATION

The present invention relates to methods and apparatus for dealing with rejections of true signatures in automatic signature verification.

Automatic signature verification has uses in financial transactions, for example with cheques and smart cards, and in providing access to facilities, such as computers, or premises. There are of course many other instances of signature use both past and future which benefit from automatic signature verification.

In known signature verification apparatus the signatory signs on an electronic input device, numerous types of which are known operating on several different principles. Some operate on the principle described in U.K. Patent No. 1,310,683 and U.S. Pat. No. 3,885,097 to provide x,y coordinates of points in the signature, others interrupt light to a sensor as opaque lines on a writing surface are crossed, as described in U.K. Patent Application No. 8626411 (Publication No. 2183071A) to provide such features as variations in speed at which different parts of a signature are written, and in other cases a noise generated while the signature is written provides information for signature verification.

In most signature verification methods, an initial phase is used to train signature verification apparatus. Each person, or "signatory", whose signature is to be verifiable is required to provide a few signature samples and in many signature verification methods these samples are automatically measured to provide sets of static and/or dynamic values, each of which represents a different attribute of the signature. (Dynamic values depend on signature features which are only apparent when a signature is written, for example the number of times a pen used to write the signature is lifted from contact with a writing surface.) These static and/or dynamic values are then used to determine, for example by averaging, "normal" values.

Signatures presented later for verification are judged by making the same measurements as in the training phase to obtain values and comparing the values obtained with the "normal" values. In simple procedures if the measured values of a new signature fall within specified limits of the "normal values" a signature is considered to be recognised. However procedures which determine overall performance based on the measured values of a signature to be verified in comparison with the "normal" values are preferably used.

Such signature verification methods are known as pattern or template correlative verification methods.

A problem which occurs in known methods of signature verification is that a small percentage of authentic signatures are rejected as forgeries and as a result most such systems are not regarded as satisfactory, particularly since users feel insulted when their authentic signature is rejected. Limits used in signature verification can be altered to avoid most false rejections but then an unacceptable number of forgeries is accepted as authentic.

According to a first aspect of the present invention there is provided a method of automatic signature verification comprising, comparing measured values representing a trial signature to be verified with corresponding values derived from a plurality of authentic signatures to determine if any variation has occurred in the trial signature as compared with the authentic signatures which is of a type which is known to produce false rejections of authentic signatures, and allowing for any such variation in a process of verifying the trial signature.

According to a second aspect of the invention there is provided apparatus for the automatic verification of signatures comprising means for comparing measured values representing a signature to be verified with corresponding values derived from a plurality of authentic signatures to determine if any variation has occurred in the trial signature as compared with the authentic signatures which is of a type which is known to produce false rejections of authentic signatures, and means for allowing for any such variations in a process of verifying the trial signature.

The measured and derived values may be obtained from one of the above mentioned electronic input devices or any other suitable device. The derived values may be stored after derivation in, for example, a main frame computer which can be accessed from remote terminals where trial signatures are written for verification, or in personal computers connected, if required, to a computer network, or in passive or smart cards, such as credit or charge cards, which are presented when a signature is to be verified.

The derived values may be derived in any suitable one of the many known ways.

The process of signature verification may be based on any suitable one of the many known processes but is modified, for example by taking signatures which have been rejected, allowing for any variations of the said type and repeating all or part of the verification process. As an alternative variations of the said type may be allowed for before the first rejection decision is made.

The method of the first aspect of the invention may include, for each signatory, the steps of making static and/or dynamic measurements on a plurality of authentic signatures from that signatory to obtain the said derived values for that signatory, determining if there are any static or dynamic points in signatures from that signatory where larger than normal variations from the said representation are likely to occur, if any such points occur, storing information recording at least that one such point exists, and using the derived values and the stored information, as indicating where variations of the said type are likely to occur, to verify signatures alleged to be written by the signatory.

The apparatus of the second aspect of the present invention may include means for making a set of static and/or dynamic measurements on a group of authentic signatures for each person whose signature is to be recognised by the apparatus, means for obtaining the said derived values from the sets of measurements, means for determining, for each said person, if there are any static or dynamic points in signatures of that person where larger than normal variations from the representation of that person's signature are likely to occur, and means for storing the said sets of measurements and information arranged to record for each said person, if any such points occur in that person's signatures, at least that one such point exists, wherein the means for allowing for variations forms part of means for verifying signatures from the said sets of measurements and the said information held by the storage means using the said information to indicate where variations of the said type are likely to occur.

The derived values may be values used in correlative pattern or template signature verification, or a hidden Markov model as used in the method of signature verification described in U.K. Patent Application 8925478.3.

The stored information may specify the positions (spatial or temporal) in the stored representation where such points occur and/or the degree of variation likely to occur at such points.

An assumption which seems to have been made in the construction of previous signature recognisers is that a statistical approach will lead to correct signature verification because variations between signatures are random, for example limited to small changes in writing speed, size, orientation, etc. However significant variations not due to random causes also occur and such variations do not appear to have been taken into account. Such variations may be structural, that is whole parts of the "normal" signature are left out or extra parts added. Observations on our own signatures show that variations occur from one signing to another and usually these are thought to be missed dots on an "i" or crosses on a "t", or perhaps the inclusion or omission of an underline. In fact the present inventor has found that while these variations do occur they were not the most frequent structural defects found during a manual examination of signals derived from rejected signatures collected during a field trial. Some of the causes of individual signature verification found by this field trial are now given in decreasing order of frequency with approximate proportion as observed:

a) Gap 'faults' (that is while the pen is off the paper between inked segments of a signature): 59%
   i. extended gap (hesitation): 28%
   ii. extra pen-ups (often at top/bottom of ascender/descender loops where writing pressure falls away): 19%
   iii. missing pen-ups (no pen-up between segments due to slurring): 12%
b) Extra last segments (for example underlines and/or dots): 12%
c) Missing dots within the signature: 6%
d) Extra first segments (for example accidental pen-down): 4%
e) Other missing 'simple' segments within the signature (for example 't' crossings): 4%
f) Dwell (no movement) within segments: 3%
g) Missing first or last segments (possibly due to anticipation of the 'sign now' cue): 3%
h) Shortened segments (generally towards the end of the signature): 3%
i) Other 'faults' which occurred only once in the samples examined—extra dot(s) within the signature, missing underline, an extra segment within the signature. No examples of added underlines were found but such underlines are known to exist.

These data were taken from the inspection/observation of a total of 68 individually rejected signatures. Clearly the percentages quoted are not accurate in any general sense, but the ranking of 'faults' is realistic and has been used to set priorities in the development of techniques to combat them.

The larger-than-normal variations from stored signature variations, that is variations of the said type, do not occur in all persons signatures and some persons obtain a near perfect performance.

Thus the advantage of the present invention is that allowance for larger-than-normal variations can be made in signature verification, for example by methods sensitive to such variations as in the hidden Markov model technique, or in the template technique by invoking a structure sensitive method when a doubtful signature occurs or by changing representations of occasional incoming troublesome signatures so that they conform with the stored representation. Another possibility is to adjust the limits of acceptance for those persons who are known to habitually produce larger-than-normal variations.

The method of the first aspect of the invention may include the steps of using a stored representation of a normal signature of the person who is believed to have written the signature and stored information relating to at least one point, if any, in that person's signature where a larger than normal variation from the representation is likely to occur, to verify the signature making allowance for any larger than normal variation in the signature which corresponds to the stored information relating to a said point.

The second aspect of the invention may include storage means for storing representations of normal signatures of persons whose signatures are to be recognised and information for each signature relating to at least one point, if any, in that signature where a larger than normal variation from the representation for that signature is likely to occur, and means for verifying each signature for which the storage means holds a representation and information relating to a said point, if any, in that signature, by using the representation making allowance for any said larger than normal variation in the signature which corresponds to stored information relating to a said point.

The invention also relates to methods and apparatus for obtaining and storing representations of normal signatures and, for each stored representation, points in that representation where larger than normal variations in signatures often occur.

According to a third aspect of the present invention there is provided a method of automatic signature verification comprising, comparing measured values representing a trial signature to be verified with corresponding values representing an authentic signature to determine if any variation has occurred in the trial signature as compared with the authentic signature which is of a type which is known to produce false rejections of authentic signatures, and allowing for any such variation in a process of verifying the trial signature.

The invention also includes apparatus corresponding to the method of the third aspect.

According to a fourth aspect of the present invention there is provided a method or apparatus for signature verification in which an allowance is made for at least one difference between values representing a signature to be verified and values representing an expected signature wherein the difference is of a type which is expected to cause a false rejection of the signature to be verified.

Certain embodiments of the invention will now be described, by way of example, with reference to the accompanying drawings, in which.

In one example of a signature verification system to which the present invention is applied, the person whose signature is to be verified signs reference signatures using a special pen 10 connected to a computer 11 (see FIG. 1) until the computer indicates that it has extracted enough information about the person's signature from the data supplied by the pen 10 to be able to carry out satisfactory signature verification. From then on the computer 11 can verify signatures but if a signature is rejected then it may be due to variations of the type mentioned above which are not due to random causes and/or are known to cause false rejections. The computer program allows for some such variations if a trial signature received for verification is not at first accepted. In this embodiment static or dynamic points of the signature where such variations are likely to occur are not determined during the learning phase when reference signatures are provided. Instead rejected signatures are corrected where one, or sometimes more, non-random variations of certain types occur. It will however be clear that the determination of such points is a useful step which can be used in some embodiments of the invention.

Figure 1:
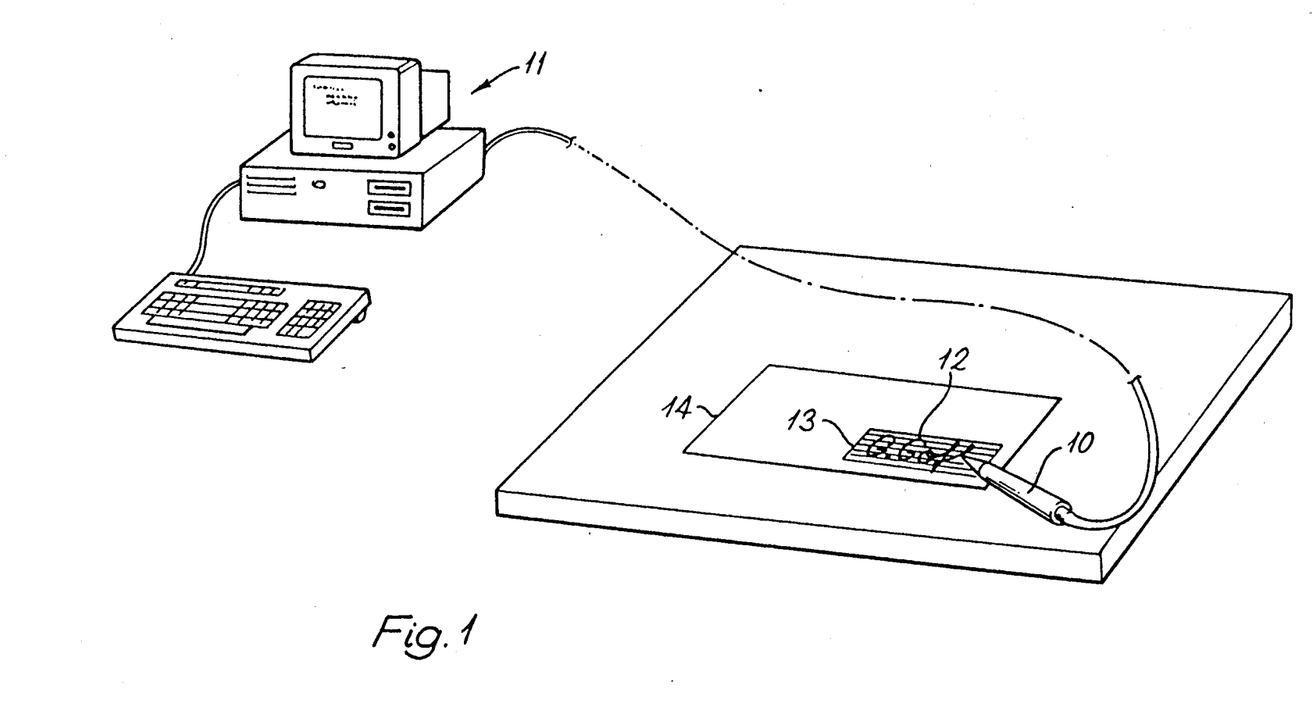
FIG. 1 is a schematic diagram of a signature verification apparatus according to the invention.

In FIG. 1 a signature 12 is shown partially written on an area 13 carrying closely printed horizontal lines. The area 13 is on a paper 14 which may, for example, be a cheque. Signature verification is carried out using the method described in the above mentioned British Patent Application No. 8626411 and U.S. application Ser. No. 137,676 where the special pen 10 senses each time one of the parallel lines in the area 13 is crossed. The method described in these applications also depends on the above mentioned U.K. Patent No. 1,310,683 and corresponding U.S. Pat. No. 3,885,097 and for this purpose the pen 10 is also arranged to sense when it is in contact, or out of contact with the paper 14. The pen may be pressure sensitive for this purpose or the amount or colour of light received by the pen can be used to detect contact when, especially for the latter alternative, the lines in the area 13 are printed in a distinctive colour. When the reference signatures are written the computer program divides the information received into segments, the ends of which correspond to when the pen is lifted from the paper; for example in the signature shown in FIG. 1 the first segment might end after the first "G" and the second segment might end after the fullstop. A third segment follows but it has not been completed.

For each segment a large number of measures are stored, some of which are as follows:
the number of events in the segment,
the number of lines crossed in the segment,
the sum of the times at which events occur, and
the sum of the distances at which events occur.

An event is said to occur when the rate of change of the number of lines crossed passes through a minimum or a maximum. The time of an event is the time from the beginning of the segment until the event occurs and the distance of an event is the number of lines crossed from the beginning of a segment until the event occurs.

As the signature is written the above measures, and those not listed, are accumulated for each segment and then measures for the signature as a whole are calculated and stored. Examples of some of the measures for the signature as a whole are now given but in practice many more such measures are calculated and stored:

total writing time,
total pen-up time,
total pen-down time,
number of segments,
total number of lines crossed, and
total number of events.

Pen-up and pen-down times are the total of the intervals in a signature in which the pen is out of contact with the paper and in contact therewith, respectively.

In one form of signature verification, the mean value for each of the measures listed, and others, for the signature as a whole is calculated together with its standard deviation from measures from all the reference signatures, these calculated values being referred to in this specification as the mean reference signature.

In verification the difference between each of the measures listed for the signature as a whole as derived from a trial signature and the corresponding mean value of these differences is calculated and divided by the corresponding standard deviation to give a normalized value. The resulting normalized values are summed and the mean and root mean square (RMS) are found. The sum, mean and RMS values are summed and if the result is below a limit value the signature is recognised as valid. It will be realised that this example is given for illustration only and that in practice many more measures would usually be derived and other methods of comparison and verification may be used.

Figure 2:
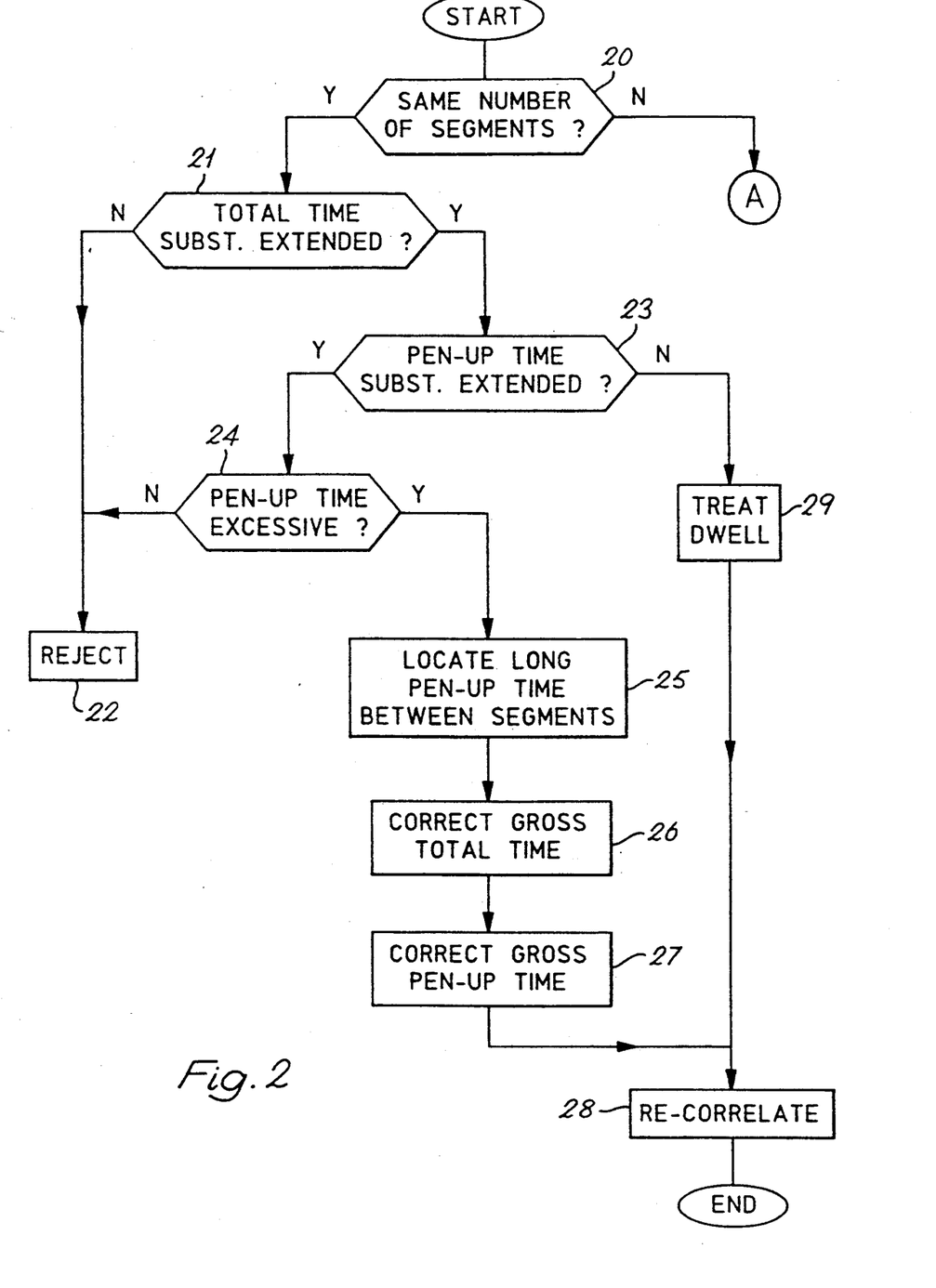
FIGS. 2, 3 and 4 are flow diagrams of a method according to the invention.
Figure 3:
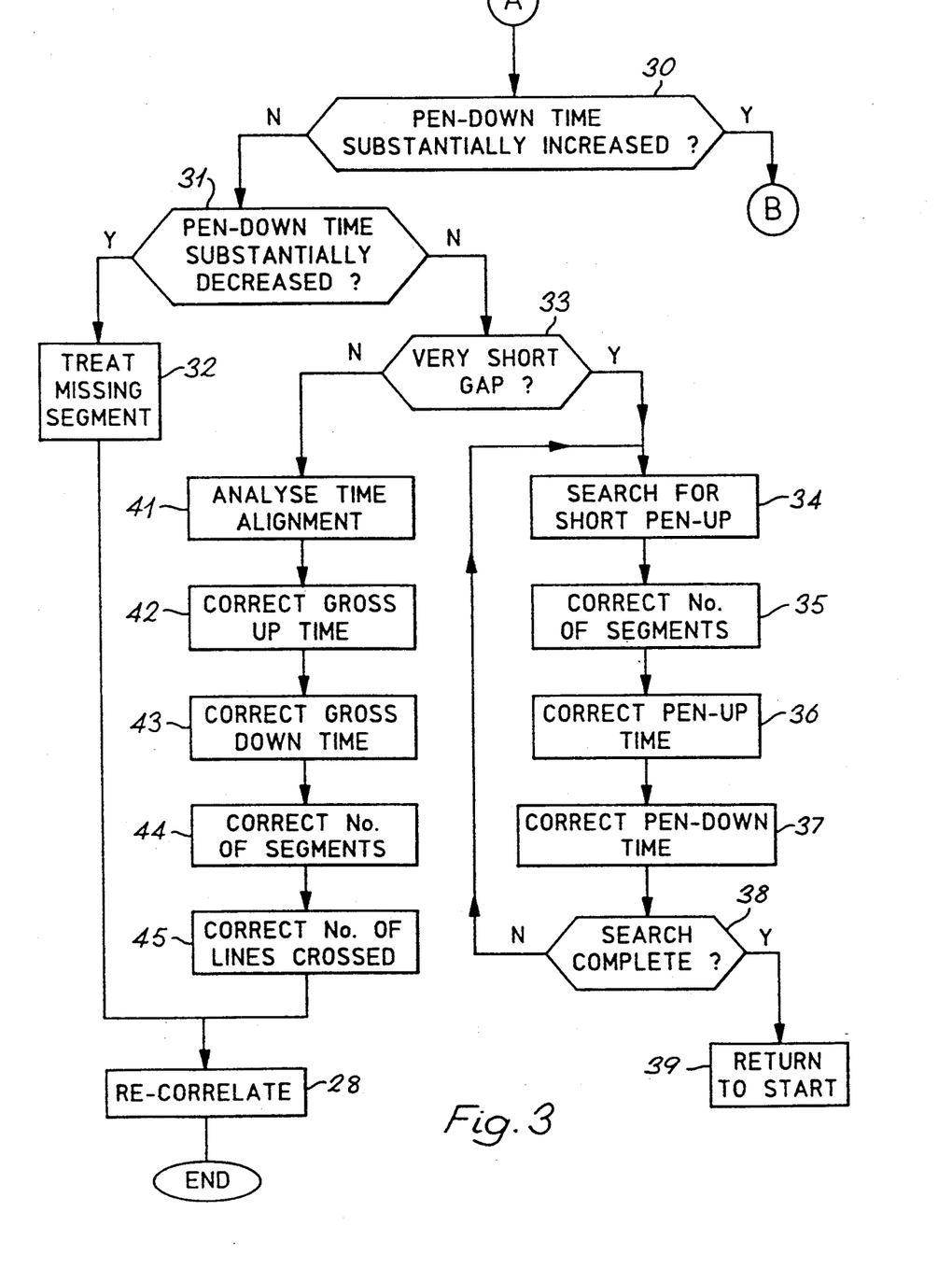
Figure 4:
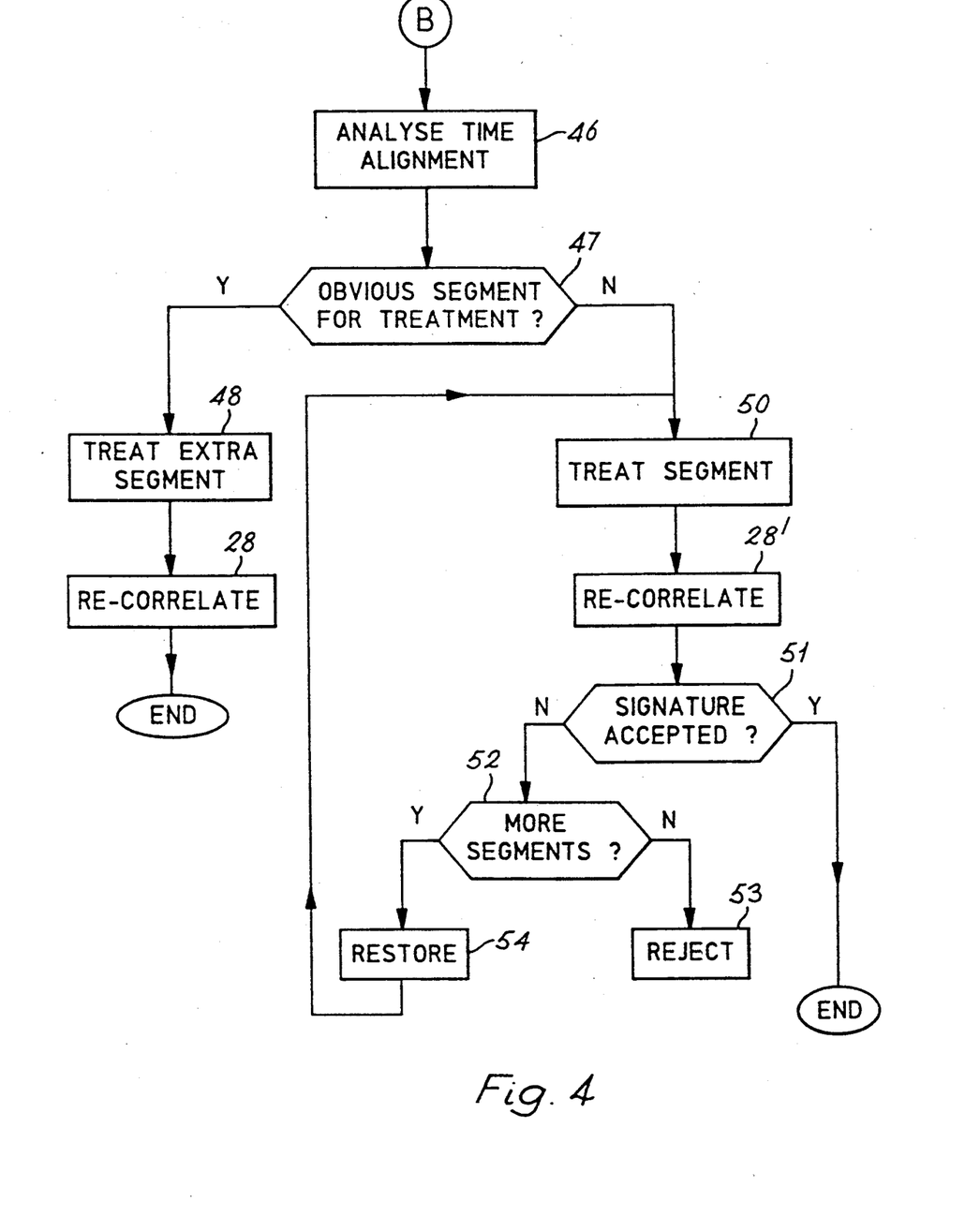

If a signature is rejected then the algorithms of FIGS. 2, 3 and 4 are employed to correct the signature.

In a test 20, the number of segments in a trial signature to be recognised is compared with the number of segments in the mean reference signature and if they are the same a test 21 determines whether the total time for the signature is substantially extended and if not the signature is rejected in an operation 22. If substantial extension of the total time occurs the tests so far indicate that either a hesitation has occurred, while the pen is not touching the paper (pen-up), or a dwell has occurred, that is with the pen touching the paper (pen-down). A test 23 determines whether the pen-up time is substantially extended, for example by more than twice the total pen-up time in the mean reference signature, or by more than a predetermined incremental time with reference to the total pen-up time in the mean reference signature. A positive result to this test indicates that a hesitation has occurred and if a test 24 shows that the pen-up time is excessive (for example greater than 10 times the expected pen-up time) then the trial signature is again rejected. If the result of the test 24 is positive then treatment for hesitation is carried out in operations 25, 26 and 27 where a long pen-up time between segments is first located in an operation 25, then the total time for the signature is corrected by subtracting this long pen-up time and substituting the expected pen-up time for that interval from the mean reference signature (the operation 26). The total pen-up time is corrected in the same way in the operation 27. Next the corrected signature measures are compared with the mean reference measures in a re-correlation operation 28 and the signature is either accepted or rejected as described above in this operation and the end of the algorithm is reached.

If the test 21 shows that the total time for the trial signature is substantially extended but the test 23 shows that the pen-up time is not substantially extended then a dwell has occurred which is treated in an operation 29 to correct the signature before re-correlation in the operation 28. Since several examples of treating measures to correct a signature are given, no details of treating dwells are given but such treatment will be apparent.

Should the result of the test 20 be negative then the algorithm of FIG. 3 is followed in which initially a test 30 is used to determine whether the pen-down time is substantially increased, for example by greater than 500 MS. If not test 31 determines whether the pen-down time is substantially decreased and if it is then a segment has been missed and the trial signature is treated by the addition of the missing segment from the mean reference signature in an operation 32; after which re-correlation in the operation 28 occurs. Note that the operation 28 is shown, for convenience, in FIGS. 2, 3 and 4.

If pen-down time has not substantially decreased (see the test 31) then a test 33 is used to determine whether a very short gap, for example less than 100 MS, has appeared. Such gaps are almost always the result of involuntary loss of contact between the pen and the paper when a reduction of pressure occurs such as might appear if the signature was being written with a pen and a small gap in the signature occurred due to insufficient pressure on the pen. If the test 33 shows that a very short gap has appeared then an operation 34 follows to search through the segments in turn for a short pen-up. Treatment for a short pen-up now follows in the form of operations 35, 36 and 37: in the operation 35 the number of segments in the signature to be verified is reduced by one, in the operation 36 the pen-up time is corrected by substracting the duration of the pen-up and in the operation 37 the pen-down time is corrected by adding the duration of the gap. Next a test 38 determines whether the end of the last segment in the signature has been reached and if not a jump back to the operation 34 occurs. Since very short gaps are, almost always, involuntary, treatment for such gaps can be followed by tretament for other non-random errors and so an operation 39 occurs when the search is complete to return the algorithm to the first operation (operation 20) of FIG. 2. No such return occurs, in this example, after other treatments to correct a trial signature because too much treatment of this kind degrades the verification process. However it may be that some combinations of treatment can be allowed. If required the re-correlation operation 28 can be carried out after the search has been completed as indicated by the test 38 and then if the signature is accepted no return to the operation 20 is necessary.

One of the measures which is recorded for the mean reference signature and a trial signature is the time of occurrence of the beginning and end of each segment and thus the position of short segments such as dots of fullstops is known. When the test 33 has a negative result it is an indication that a dot or fullstop has occurred and the position of each very short segment, corresponding to a dot or fullstop, in the mean reference signature is compared with such very short segments in the trial signature in an operation 41. When a dot or fullstop is found in the trial signature but is not present in the mean reference signature this additional dot or fullstop is removed carrying out the corrections of operations 42 to 45 as follows:

correct the total pen-up time by substracting the duration of the gap following the spurious dot,
correct the total pen-down time by subtracting the duration of the dot,
correct the number of segments by subtracting one, and correct the number of lines crossed by subtracting the number of lines in the segment which represent the spurious dot.

Following these corrections the re-correlation operation 28 is carried out.

If test 30 shows that the pen-down time has increased substantially then an extended extra segment may have occurred, for example due to the insertion of an extra initial or the underlining of the signature. The algorithm of FIG. 4 is then followed and in an operation 46 the times of the beginnings and ends of each segment in the mean reference signature and the trial signature are compared. A test 47 is then carried out which indicates from this comparison whether one segment is clearly additional to those in the mean reference signature. If so then that segment is removed in an operation 48 and the re-correlation operation 28 is carried out. If the test 47 shows that there is no segment which is clearly out of time alignment between the two signatures then the signature is corrected on the basis that the first segment occurring in the signature to be verified is spurious (operation 50). Then a trial re-correlation is carried out in an operation 28' which is similar to the operation 28 except that it is followed by a test 51 to determine whether the signature has been accepted. If not and there are further segments (test 52) the segment treated is restored (operation 54) to the condition before the operation 50 and a jump back to the operation 50 occurs for treatment of the next segment in the signature to be verified. If the test 52 indicates that there are no further segments, the signature is rejected in an operation 53.

Other tests and treatments for the trial signature are usually made before a trial signature which has not been finally rejected reaches that stage.

Now that embodiments of the invention have been specifically described and the invention described in general terms it will be appreciated that the invention can be put into practice in many other ways.

I claim:

1. A method of automatic signature verification comprising the steps of:

deriving a plurality of different types of values from a trial signature to be verified, each of said types being ones which are derived in different ways and in which variations are known to occur which give false rejections of authentic signatures, making a plurality of comparisons, each comparison being between one of the said values from said trial signature and a corresponding value derived from a plurality of authentic signatures, testing to determine which of the said variations which give false rejections of authentic signatures are likely to have occurred, and deciding the authenticity of the trial signature, based on said making comparisons step and said testing step by changing at least one of the values corresponding to at least one of the variations which the testing indicates as likely to have occurred, to make acceptance to the trial signature more likely.

2. A method according to claim 1 wherein
the trial signature is written with a writing instrument on a writing surface,
said deriving step includes determining intervals in which the writing instrument and the writing surface are in contact and out of contact with one another, and
the said type of variation is chosen from:

extended intervals in the time the writing instrument is out of contact with the writing surface, extended intervals in the time the writing instrument is in contact with the writing surface, short time intervals in which the writing instrument is out of contact with the writing surface when it would be expected to be in contact therewith, short time intervals in which the writing instrument is in contact with the writing surface when it would be expected to be out of contact therewith, relatively long time intervals in which the writing instrument is in contact with the writing surface when it would be expected to be out of contact therewith, and missing time intervals in which the writing instrument would be expected to be in contact with the writing surface.

3. A method according to claim 2 wherein a short interval in which the writing instrument is out of contact with the writing surface has a duration of less than 100 MS.

4. A method according to claim 2 wherein a short interval in which the writing instrument is in contact with the writing surface has a duration of less than 500 MS.

5. A method according to claim 1 wherein the trial signature is written with a writing instrument on a writing surface, said deriving step includes determining intervals in which the writing instrument and the writing surface are in contact and out of contact with another, said changing step comprises so changing the said measured values that the variation disappears, and the said type of variation is chosen from:

extended intervals in the time the writing instrument is out of contact with the writing surface, extended intervals in the time the writing instrument is in contact with the writing surface, short time intervals in which the writing instrument is out of contact with the writing surface when it would be expected to be in contact therewith, short time intervals in which the writing instrument is in contact with the writing surface when it would be expected to be out of contact therewith, and missing time intervals in which the writing instrument would be expected to be in contact with the writing surface.

6. A method according to claim 5 wherein if a variation is a said missing interval, changes are made in the said measured values to represent an additional interval in which the writing instrument is in contact with the writing surface, the said changes being based on the valves derived from the group of authentic signatures.

7. A method according to claim 1 wherein said testing step includes:

using stored information relating to at least one point in trial signatures where one of said variations is likely to occur in said testing to determine if any said variation has occurred.

8. A method of automatic signature verification comprising:

writing a trial signature with a writing instrument on a writing surface, determining durations of intervals during which the writing instrument is out of contact with the writing surface, comparing measured values representing a trial signature to be verified with corresponding values derived from a plurality of authentic signatures to verify the trial signature, including comparing a value of the duration of any said interval in the trial signature with a corresponding value derived from the authentic signatures, and allowing for variation in the said duration, if not greater than a predetermined amount, by changing one of the values compared to make acceptance of the trial signature more likely; and verifying the trial signature as a result of the comparing step and the allowing step.

9. A method according to claim 8 including, for each signatory, the steps of making measurements on a plurality of authentic signatures from that signatory to obtain the said derived values for that signatory, determining if there are any points in signatures from that signatory where larger than normal variations from the said representation are likely to occur, if any such points occur, storing information recording at least that one such point exists, and using the derived values and the stored information, as indicating where said variations of the said type are likely to occur.

10. A method according to claim 8, including the further steps of:

determining if any further variation, in addition to said variation of the duration of one said interval, has occurred which is of a type which is known to produce false rejections of authentic signatures, and allowing for said further variation by changing one of the values compared to make acceptance of the trial signature more likely.

11. A method according to claim 10 wherein said further variations are variations from the group consisting of:

extended intervals in the time the writing instrument is in contact with the writing surface, short time intervals in which the writing instrument is in contact with the writing surface when it would be expected to be out of contact therewith, relatively long time intervals in which the writing instrument is in contact with the writing surface when it would be expected to be out of contact therewith, and missing time intervals in which the writing instrument would be expected to be in contact with the writing surface.

12. A method according to claim 11 wherein a short interval in which the writing instrument is in contact with the writing surface has a duration of less than 500 MS.

13. A method according to claim 11 wherein if a variation is said missing interval, changes are made in the said measured values to represent an additional interval in which the writing instrument is in contact with the writing surface, said changes being based on the values derived from the group of authentic signatures.

14. A method according to claim 11 comprising the further step of:

using stored information relating to at least one point, in trial signatures where said variation is likely to occur, in determining if any said variation has occurred.

15. A method according to claim 11 including, for each signatory, the steps of:

making measurements on a plurality of authentic signatures from that signatory to obtain the said derived values for that signatory, determining if there are any points in signatures from that signatory where larger than normal variations from the said representation are likely to occur, if any such points occur, storing information recording at least that one such point exists, and using the derived values and the stored information as indicating where the said variations are likely to occur.

16. Apparatus for automatic verification of signatures comprising:

means for deriving a plurality of different types of values from a trial signature to be verified, said types being ones which are derived in different ways and in which variations occur which give false rejections of authentic signatures, means for making a plurality of comparisons, each comparison being between one of the said values from the trial signature and a corresponding value derived from a plurality of authentic signatures, means for testing to determine which of the said variations which give false rejections of authentic signatures are likely to have occurred, and means for deciding the authenticity of the trial signature based on said plurality of comparisons and at least one of the said variations which the testing means indicates as likely to have occurred, by changing at least one of the values compared to make acceptance of the trial signature more likely.

17. Apparatus according to claim 16 further comprising storage means for storing information relating to at least one point in the trial signatures where one of said variations is likely to occur, wherein the means for carrying out tests uses the stored information in determining if any said variation has occurred.

18. Apparatus according to claim 16 including means for making a set of measurements on a group of authentic signatures for each person whose signature is to be recognized by the apparatus, means for obtaining the said derived values from the sets of measurements, means for determining, for each said person, if there are any points in signatures of that person where said larger than normal variations are likely to occur, and storage means for storing the said sets of measurements and information arranged to record for each said person, if any such points occur in that person's signatures, where in the signature such points exist, wherein the means for carrying out tests includes the said information held by the storage means to indicate where variations of the said type are likely to occur.

19. A method of automatic signature verification comprising the steps of:

writing a trial signature with a writing instrument on a writing surface, determining durations of intervals during which the writing instrument is out of contact with the writing surface, comparing measured values representing a trial signature to be verified with corresponding values representing an authentic signature, to verify the trial signature including comparing a value of the duration of any said interval in the trial signature with a corresponding value derived from the authentic signatures, and verifying the trial signature as a result of the comparisons while allowing for variation in the said duration, if not greater than a predetermined amount, by changing at least one of the values compared to make acceptance of the trial signature more likely.

20. Apparatus for automatic verification of signatures comprising:

means, for use when a signature which is to be verified is written, for determining durations of intervals in which a writing instrument is out of contact with a writing surface, means for comparing measured values representing a trial signature to be verified with corresponding values derived from a plurality of authentic signatures to verify the trial signature, including comparing a value of any said durations in the trial signature with a corresponding value derived from the authentic signatures, and means for verifying the trial signature based on said comparing done by said comparing means, while allowing for variation in any said durations, if not greater than a predetermined amount, by changing one of the values compared to make acceptance of the trial signature more likely.

* * * * *